US008611698B2

(12) United States Patent
Chamaret et al.

(10) Patent No.: US 8,611,698 B2
(45) Date of Patent: Dec. 17, 2013

(54) METHOD FOR IMAGE REFRAMING

(75) Inventors: Christelle Chamaret, Chantepie (FR); Olivier Le Meur, Talensac (FR); Clement Rousseau, Le Havre (FR)

(73) Assignee: Thomson Licensing, Issy les Moulineaux (FR)

( * ) Notice: Subject to any disclaimer, the term of this patent is extended or adjusted under 35 U.S.C. 154(b) by 71 days.

(21) Appl. No.: 12/799,946

(22) Filed: May 5, 2010

(65) Prior Publication Data

US 2012/0063685 A1 Mar. 15, 2012

(30) Foreign Application Priority Data

May 5, 2009 (FR) ...................................... 09 52965

(51) Int. Cl.
*G06K 9/32* (2006.01)
*G06K 9/20* (2006.01)
*G06K 9/34* (2006.01)
*G09G 5/37* (2006.01)
*G09G 5/00* (2006.01)
*H04N 5/44* (2011.01)
*H04N 9/74* (2006.01)
*H04N 3/223* (2006.01)
*H04N 1/387* (2006.01)
*H04N 1/393* (2006.01)

(52) U.S. Cl.
USPC ........... 382/298; 382/282; 382/295; 382/173; 345/620; 345/648; 345/672; 345/660; 348/561; 348/581; 348/582; 348/704; 358/453; 358/451

(58) Field of Classification Search
None
See application file for complete search history.

(56) References Cited

U.S. PATENT DOCUMENTS

| 6,940,995 | B2 * | 9/2005 | Choi et al. ................... 382/100 |
| 7,853,063 | B2 * | 12/2010 | Barski et al. ................. 382/132 |
| 8,122,356 | B2 * | 2/2012 | Lawther et al. .............. 715/716 |
| 2002/0114535 | A1 * | 8/2002 | Luo ............................... 382/282 |
| 2002/0191861 | A1 * | 12/2002 | Cheatle ........................ 382/282 |
| 2004/0128317 | A1 * | 7/2004 | Sull et al. ................... 707/104.1 |
| 2005/0025387 | A1 * | 2/2005 | Luo ............................... 382/298 |
| 2008/0031505 | A1 * | 2/2008 | Barski et al. ................. 382/132 |
| 2008/0298796 | A1 * | 12/2008 | Kuberka et al. .............. 396/263 |
| 2009/0027552 | A1 * | 1/2009 | Yang et al. ................... 348/465 |
| 2009/0094518 | A1 * | 4/2009 | Lawther et al. .............. 715/716 |
| 2010/0201871 | A1 * | 8/2010 | Zhang et al. ................. 348/465 |

FOREIGN PATENT DOCUMENTS

| EP | 0800148 A2 | 10/1997 |
| EP | 1120742 A2 | 8/2001 |
| GB | 2370438 A | 6/2002 |

OTHER PUBLICATIONS

French Search Report for PR 0952965 dated Nov. 30, 2009.

* cited by examiner

*Primary Examiner* — Randolph I Chu
(74) *Attorney, Agent, or Firm* — Tutunjian & Bitetto, P.C.

(57) ABSTRACT

The invention relates to a method for reframing an image according to at least one predefined reframing method to obtain a reframed image for which the format ratio is equal to a target format ratio. The method comprises the following steps for: analyzing the image, selecting the predefined reframing method in a set of at least two reframing methods according to the result of the analysis step, and reframing said image using the selected reframing method. The invention also relates to a device for reframing an image.

7 Claims, 6 Drawing Sheets

METHOD FOR IMAGE REFRAMING

This application claims the benefit, under 35 U.S.C. §119 of French Patent Application 0952965, filed May 5, 2009.

1. SCOPE OF THE INVENTION

The invention relates to the general field of image reframing.

The invention relates to a device and method for reframing an image according to a predefined reframing method to obtain a reframed image for which the format ratio is equal to a target format ratio.

2. PRIOR ART

Currently, screens adapted for viewing images or video have heterogeneous formats.

In order to be able to view a same image or video on screens of different formats, it is useful to generate a reframed image or video so that the format of the image/video is adapted to the format of the screen, called the target format, on which the image/video is to be viewed.

To reframe an image it is known in the art to delete the same number of columns of pixels on the left and the right of the image so that the format of the reframed image is equal to the target format.

However, such a method is not adapted to the reframing of images in the case where the image to be reframed contains important visual information on the right and left edges of the image.

3. SUMMARY OF THE INVENTION

The purpose of the invention is to overcome at least one of the disadvantages of the prior art. For this purpose, the invention relates to a method for reframing an image according to at least one predefined reframing method to obtain a reframed image for which the format ratio is equal to a target format ratio. The method comprises the following steps:
analysing the image,
selecting the predefined reframing method in a set of at least two reframing methods according to the result of the analysis step, and
reframing the image using the selected reframing method.

The method for reframing according to the invention enables adaptation to the content of the image to be reframed.

According to a particular characteristic, the analysis step comprises a step of analysis of the saliency of the image able to associate a saliency value with each pixel of the image and a step of cognitive analysis of the image.

According to another particular characteristic, the cognitive analysis step belongs to the set of cognitive analysis steps comprising:
a face detection step,
a text detection step, and/or
a ball detection step.

Advantageously, the selection step comprises the following steps for:
calculating a confidence parameter from saliency values,
comparing the confidence parameter to a first predefined threshold value, and
selecting the reframing method according to the result of the comparison.

According to a particular characteristic, when the confidence parameter is greater than the first predefined threshold value, the reframing method selected is a method for dynamic reframing without deformation capable of delimiting a part of the image using a reframing window for which the format ratio is equal to the target format ratio.

According to another particular characteristic, when the confidence parameter is less than the predefined threshold value, the cognitive analysis step comprises a step of detection of a zone of text in the image and the reframing method is selected according to the result of the step of text zone detection.

According to another particular aspect of the invention, when a text zone is detected, the reframing method selected is a non-linear filtering method applied to the entire image.

According to another particular aspect of the invention, when no text zone is detected, the cognitive analysis step also comprises a step of detection of face(s) in the image and the reframing method is selected according to the result of the face(s) detection step.

According to a specific characteristic, when at least two faces are detected and when the at least two faces are not capable of being comprised inside a reframing window of format ratio equal to the target format ratio then the reframing method selected is a dynamic reframing method with deformation,
otherwise the reframing method selected is a fixed reframing method without deformation.

Advantageously, when a single face is detected, if the average saliency of said image from which is subtracted the average saliency of said single face is less than a second predefined threshold value or greater than a third predefined threshold value, the second and third threshold values being defined such that the third threshold value is greater than the second threshold value then the reframing method selected is a fixed reframing method without deformation,
else
if the saliency in the image is spread then the reframing method selected is a dynamic reframing method with deformation,
otherwise the reframing method selected is a fixed reframing method without deformation.

Advantageously, when no face is detected, if the average saliency of said image from which is less than a second predefined threshold value or greater than a third predefined threshold value, the second and third threshold values being defined such that the third threshold value is greater than the second threshold value then the reframing method selected is a fixed reframing method without deformation,
otherwise
if the two pixels of the image of maximum saliency value are not capable of being comprised in a reframing window of format ratio equal to the target format ratio then the reframing method selected is a dynamic reframing method with deformation,
otherwise the reframing method selected is a fixed reframing method without deformation.

The invention relates moreover to a device for reframing an image according to at least one predefined reframing method to obtain a reframed image for which the format ratio is equal to a target format ratio capable of implementing the steps of the method of the invention. For this purpose, the reframing device comprises an image analysis module, a selection module capable of selecting, for the image, the reframing method in a set of at least two reframing methods according to the result of the analysis carried out by the analysis module and a reframing module capable of reframing said image using the reframing method selected.

4. LIST OF FIGURES

The invention will be better understood and illustrated by means of non-restrictive embodiments and advantageous implementations, with reference to the accompanying drawings, wherein.

Figure 5:
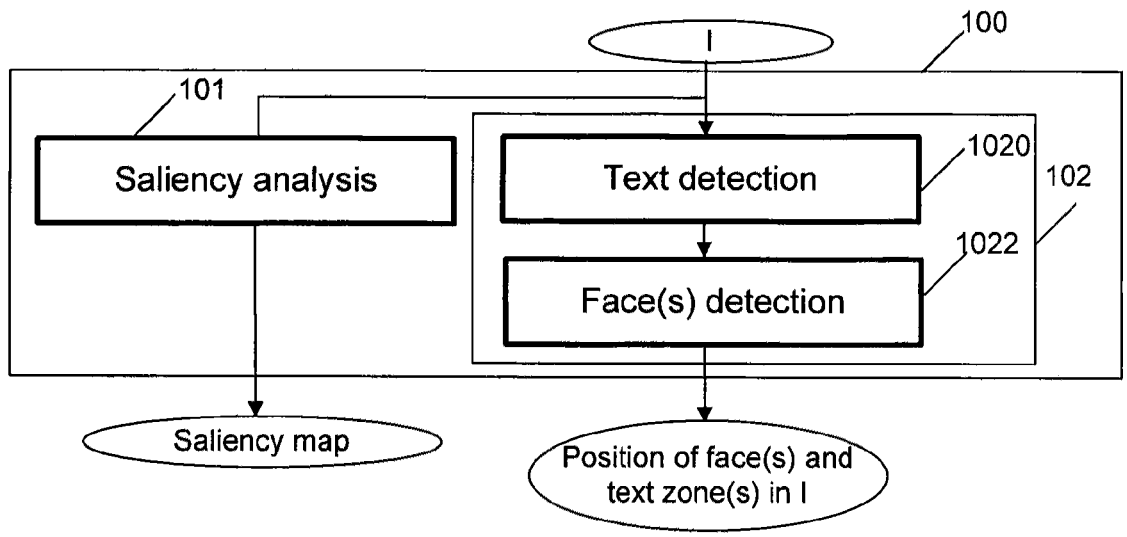
Figure 6:
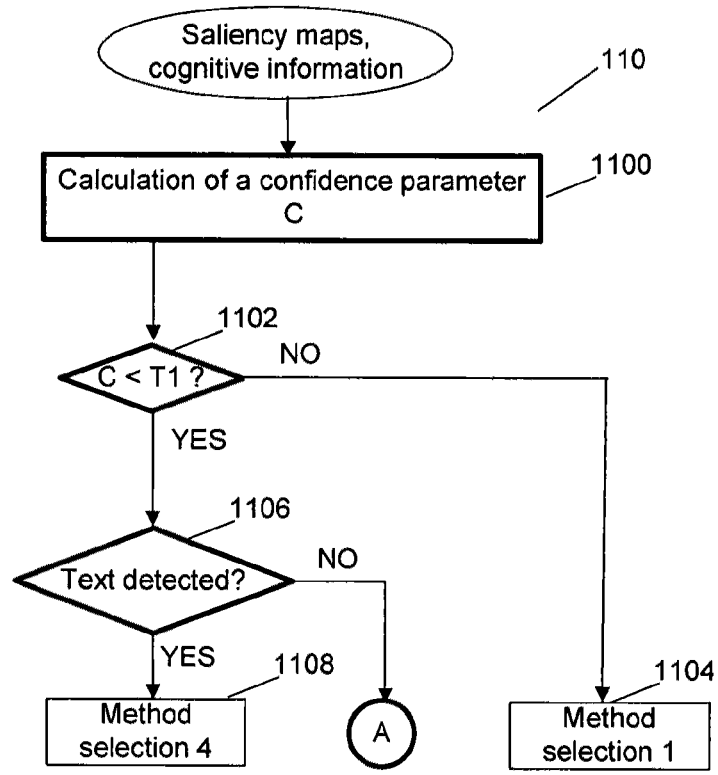
Figure 7:
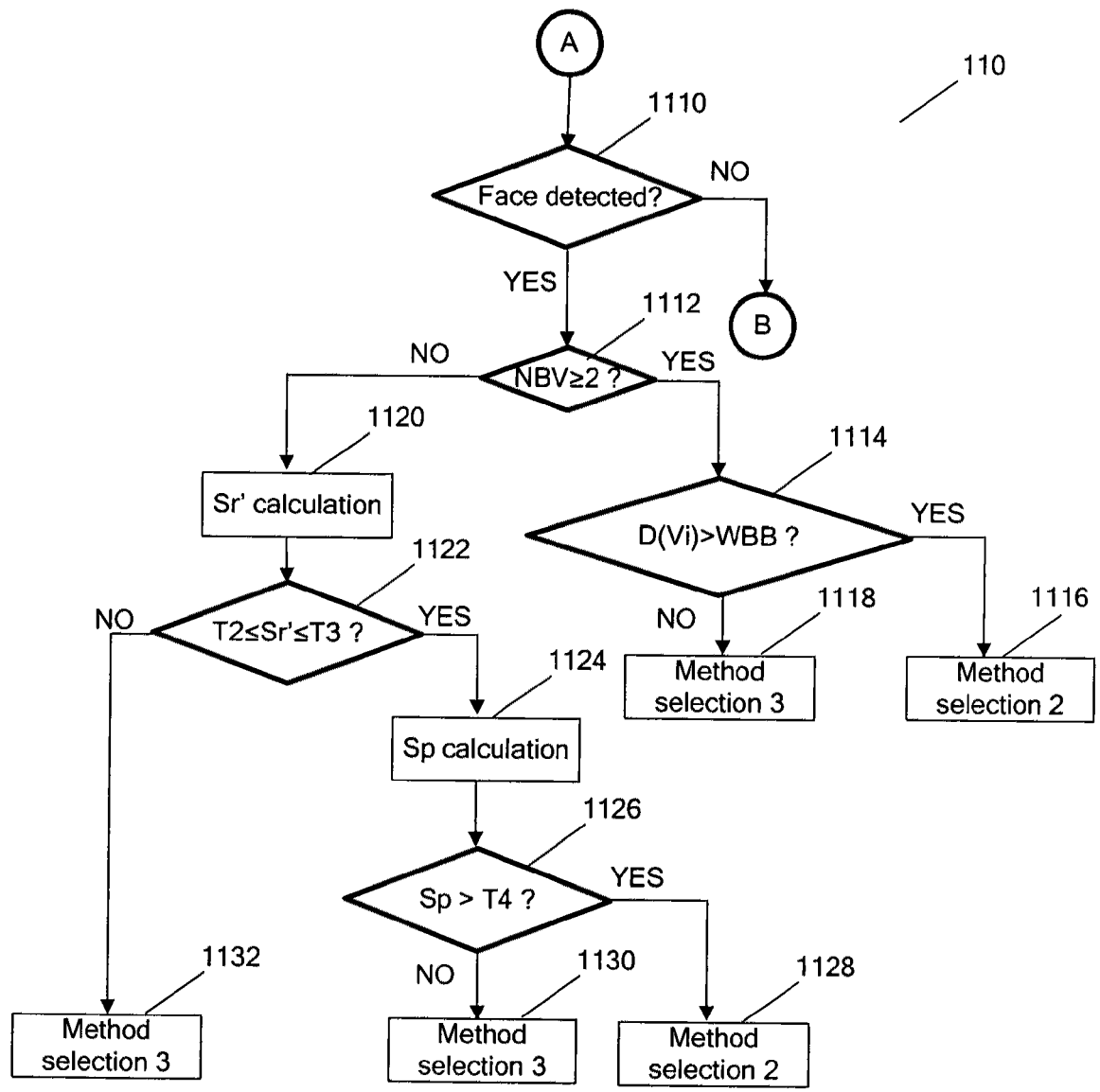
Figure 8:
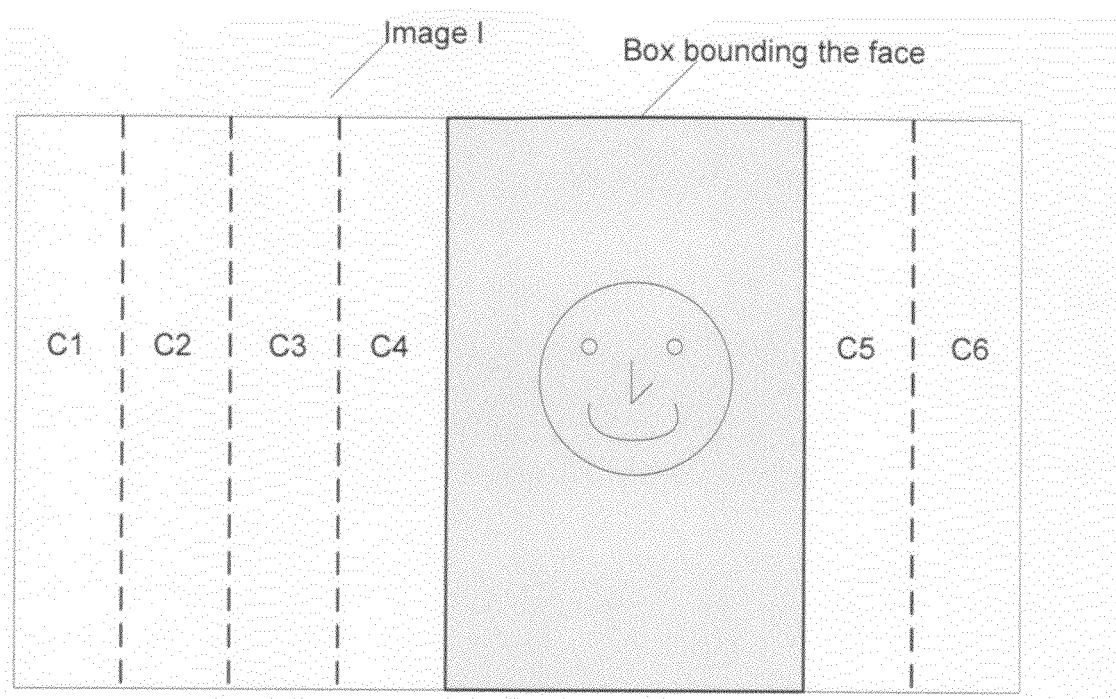
Figure 9:
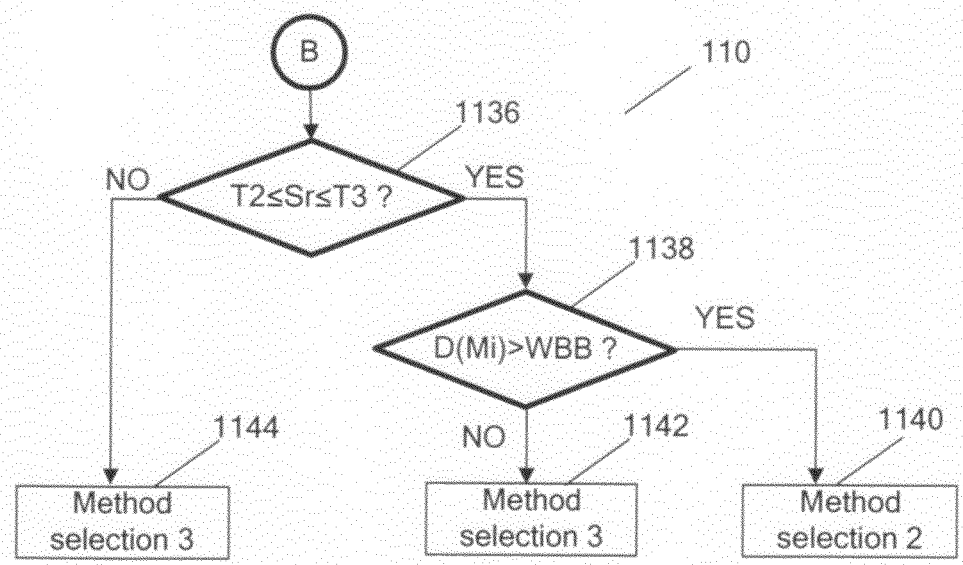
Figure 10:
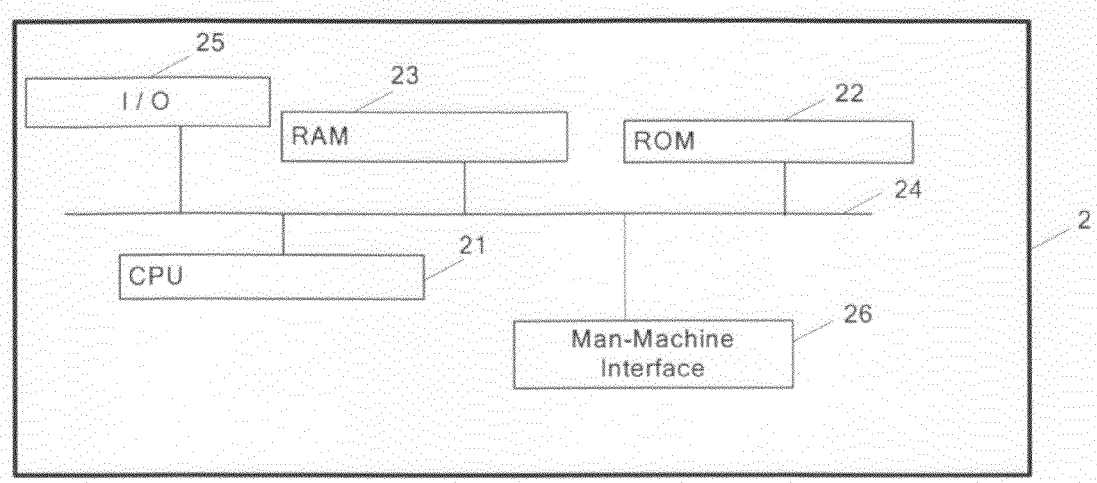
Figure 11:
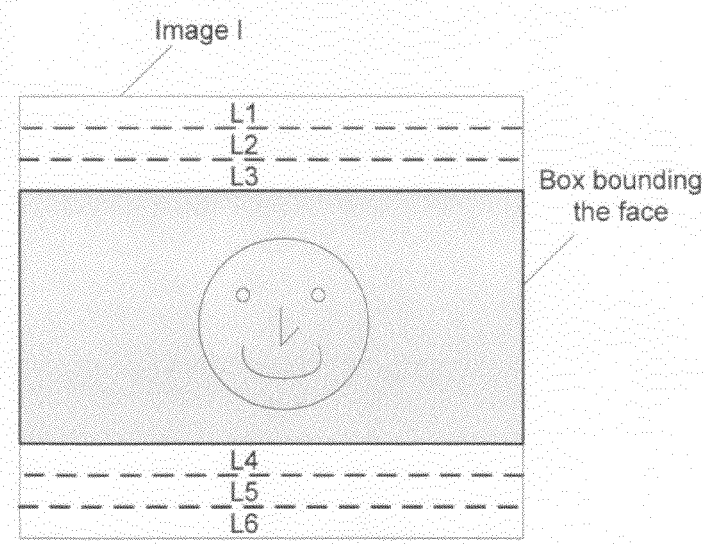

FIG. 5 shows a particular embodiment of the first step of the reframing method according to the invention, FIG. 6 shows a second step of the reframing method according to the invention, FIG. 7 shows the second step of the reframing method according to the invention, FIG. 8 shows the calculation of a value representative of the saliency distribution in the image, FIG. 9 shows the second step of the reframing method according to the invention, and FIG. 10 illustrates a reframing device according to the invention, and FIG. 11 shows the calculation of a value representative of the saliency distribution in the image.

5. DETAILED DESCRIPTION OF THE INVENTION

The invention relates to the reframing of an image I that is isolated or that belongs to a sequence of more than one images. The method for reframing the image I consists in generating from the image I an image Irec for which the format ratio, i.e. the ratio between its width and its height, is equal to a target format ratio $R_{target}$. For example, a reframing method is able to reframe an image of format 4/3 to generate an image at format 16/9.

The image I to be reframed is composed of pixels or image points to each of which is associated at least one item of image data, for example an item of luminance image data or an item of chrominance image data. When the image I belongs to a sequence of more than one image, the reframing method according to the invention can be applied to each image of the sequence to generate a sequence of reframed images.

Figure 1:
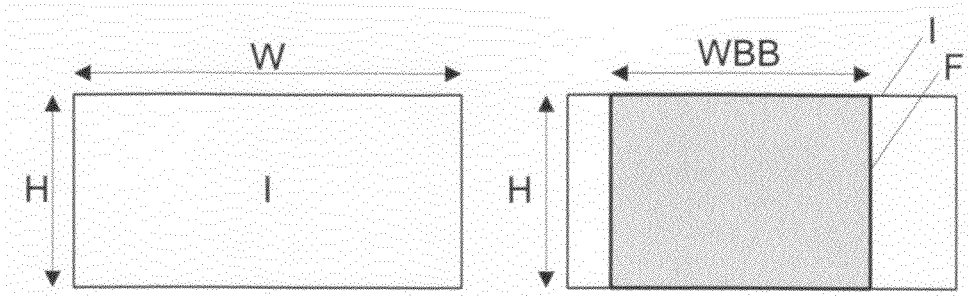
FIG. 1 shows an image to be reframed on which is overlaid a reframing window.

An image I to be reframed is shown on the left part of FIG. 1. This image I has a height of H pixels and a width of W pixels. On the right part of FIG. 1, the image I on which is overlaid a reframing window F is shown. The reframing window F has a height of H pixels and a width of WBB pixels defined such that WBB=H*$R_{target}$. According to a variant, the reframing window F has a width of W pixels and a height of HBB pixels defined such that W/$R_{target}$=HBB. Hereafter in the interests of simplicity, it is considered that the reframing window has a height equal to H and a width WBB that can be adapted according to the target format ratio $R_{target}$. In this case, the distances are defined are in the sense of the width of the image. However, it is clear that the same reframing method according to the invention can be applied in the other sense by considering a reframing window of width W and of adaptable height according to the target format ratio $R_{target}$.

Figure 2:
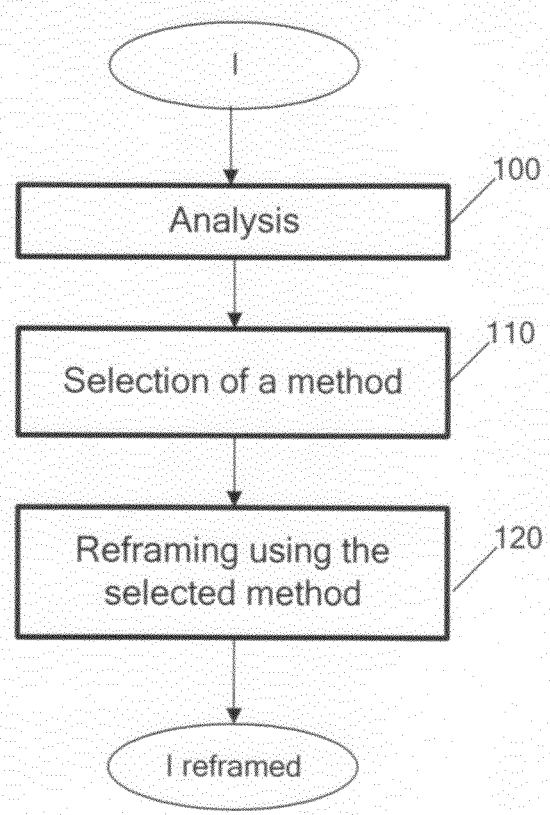
FIG. 2 shows a reframing method according to the invention.

FIG. 2 shows an embodiment of the reframing method according to the invention. At step 100, the image I to be reframed is analyzed. More specifically, the item or items of image data associated with each of its pixels is/are analyzed.

At step 110, a particular reframing method is selected according to the result of the analysis carried out in step 100 in a set of at least two predefined reframing methods.

This set comprises preferably a first dynamic reframing method of the original image without deformation. The term "dynamic" signifies that the position of the reframing window F in the image can vary from one image to another image in a sequence of several images. The term "deformation" signifies that the objects in the image I are deformed by the reframing method. The reframing method described in the patent application 06117768.9 published in Jan. 31, 2007 under the number EP1748385 is an example of such a dynamic reframing method without deformation. In this example, the reframed image is generated according to saliency values associated with each pixel of the image I to be reframed. Another example of such a method is a manual reframing method in which an operator manually delimits the reframing window F according to the image content and the regions of interest that he identifies in the image.

This set also comprises a second dynamic reframing method with deformation. The method known as seam calving, described in the document by S. Avidan and A. Shamir titled "Seam carving for content-aware image resizing" and published in 2007 during the Siggraph conference, is an example of such a dynamic reframing method with deformation. According to this method the pixels of less importance from a visual point of view are deleted to generate the reframed image. The importance of pixels is for example represented by a saliency value that is associated with them.

This set also comprises a third fixed reframing method without deformation. This method type consists in extracting a sub-part of the original image based on a cognitive element such as the presence of a face and in conserving this position throughout the scene. Hence this method is fixed, as opposed to dynamic, as the position of the reframing window F is the same from one image to another. The position of the reframing window is for example based on the face detection in the first image. For example, the face detection method described in the document by H. Schneiderman and T. Kanade entitled "A statistical method for 3D object detection applied to faces and cars" and published during the conference IEEE Computer vision and pattern recognition in 2000 can be used.

This set also comprises a fourth fixed reframing method with deformation. According to a particular embodiment, this reframing method consists in a deformation of the entire image to obtain an image deformed to the target format ratio. For this purpose, a non-linear filter of Lanczos type can be applied over the whole width of the image in order to obtain a reframed image for which the format ratio is equal to the target format ratio $R_{target}$.

In step 120, the image I is reframed into a reframed image Irec using the reframing method selected in step 100.

Figure 3:
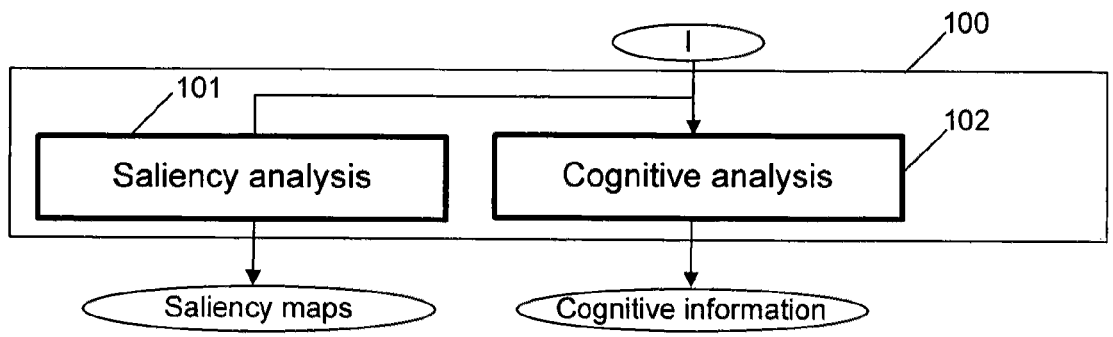
FIG. 3 shows a first step of the reframing method according to the invention.
Figure 4:
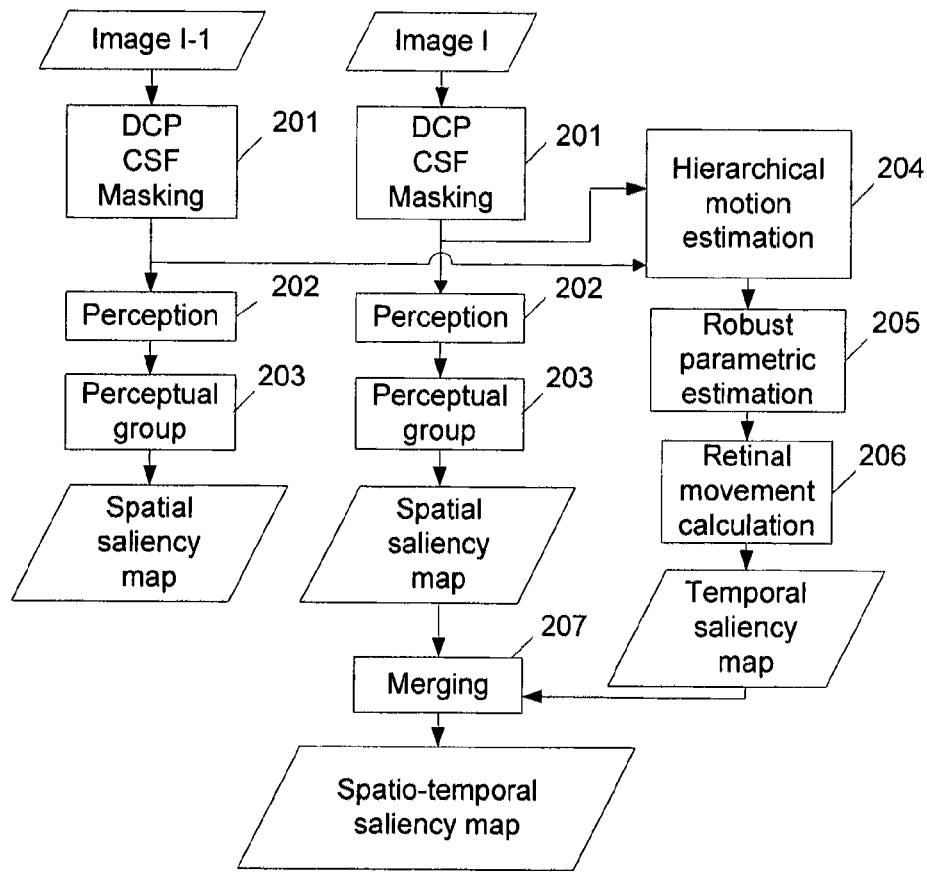
FIG. 4 shows a method for analysing the saliency of an image.

FIG. 3 shows step 100 of the reframing method according to the invention, The analysis step 100 comprises a step 101 of analysis of the saliency of the image I, i.e. of the perceptual interest of pixels on the image I. For this purpose, the method described in the European patent application EP04804828 published 30 Jun. 2005 under the number 1695288 can be used to calculate for each pixel of the image I a data item of perceptual interest also called saliency value. This method can be applied in the case where the image I belongs to a sequence of several images. This method, illustrated by FIG. 4 consists in a first spatial modelling step followed by a temporal modelling step. The image formed by the saliency values associated with each pixel of the image I is called the saliency map. The higher the saliency value associated with the pixel the more the pixel in question attracts attention. The spatial modelling step is composed of 3 steps 201, 202 and 203. During the first step 201, the incident image data (e.g. RGB components) are filtered in order to make them coherent with what our visual system would perceive while looking at the image. For this purpose, the step 201 implements tools that model the human visual system. These tools take into account the fact the human visual system does not appreciate the different visual components of our environment in the same way. This limited sensitivity is simulated by the use of Contrast Sensitivity Functions (CSF) and by the use of intra and inter component visual masking. More precisely, during the step 201, a hierarchic decomposition into perceptual channels, marked DCP in FIG. 4, simulating the frequency tiling of the visual system is applied to the components (A, Cr1, Cr2) of the space of antagonistic colours of Krauskopf, deduced from the RGB components of an image. From the frequency spectrum, a set of sub-bands having a radial frequency range and a particular angular selectivity is defined. Each subband can actually be considered to be the neuronal image delivered by a population of visual cells reacting to a particular frequency and orientation. The CSF function followed by a masking operation is applied to each subband. An intra and inter component visual masking operation is then carried out.

During the second step 202, the sub-bands from the step 201 are convoluted with a close operator of a difference of Gaussians (DoG). The purpose of step 202 is to simulate the visual perception mechanism. This mechanism enables the visual characteristics containing important information to be extracted (particularly local singularities that contrast with their environment) leading to the creation of an economic representation of our environment. The organisation of the reception fields of the visual cells whether they are retinal or cortical fully meet this requirement. These cells are circular and are constituted by a centre and an edge having antagonistic responses. The cortical cells also have the particularity of having a preferred direction. This organisation endows them with the property of responding strongly on contrasts and of not responding on uniform zones. The modelling of this type of cell is carried out via differences of Gaussians (DoG) whether oriented or not. The perception also consists in emphasising some characteristics essential to the interpretation of the information. According to the principles of the Gestaltist school, a butterfly filter is applied after the DoG to strengthen the collinear, aligned and small curvature contours. The third step 203 consists in constructing the spatial saliency map. For this purpose, a fusion of the different components is carried out by grouping or by linking elements, a priori independent, to form an image that can be comprehended by the brain. The fusion is based on an intra and inter component competition enabling the complementarity and redundancy of the information carried by different visual dimensions to be used (achromatic or chromatic).

The temporal modelling step, itself divided into 3 steps 204, 205 and 206, is based on the following observation: in an animated context, the contrasts of movement are the most significant visual attractors. Hence, an object moving on a fixed background, or vice versa a fixed object on a moving background, attracts one's visual attention. To determine these contrasts, the recognition of tracking eye movements is vital. These eye movements enable the movement of an object to be compensated for naturally. The velocity of the movement considered expressed in the retinal frame is therefore almost null. To determine the most relevant movement contrasts, it is consequently necessary to compensate for the inherent motion of the camera, assumed to be dominant. For this purpose, a field of vectors is estimated at the step 204 by means of a motion estimator working on the hierarchic decomposition into perceptual channels. From this field of vectors, a complete refined parametric model that represents the dominant movement (for example translational movement) is estimated at the step 205 by means of a robust estimation technique based on M-estimators. The retinal movement is then calculated at step 206. it is equal to the difference between the local movement and the dominant movement. The stronger the retinal movement (by accounting nevertheless for the maximum theoretical velocity of the tracking eye movement), the more the zone in question attracts attention. The temporal saliency that is proportional to the retinal movement or to the contrast of movement is then deduced from this retinal movement. Given that it is easier to detect a moving object among fixed disturbing elements (or distracters) than the contrary, the retinal movement is modulated by the overall quantity of movement of the scene.

The spatial and temporal saliency maps are merged in step 207. The merging step 207 implements a map intra and inter competition mechanism. Such a map can be presented in the form of a heat map indicating the zones having a high perceptual interest.

In the case where the image I is isolated, only the spatial saliency map is determined according to the steps 201, 202 and 203 described above.

However, the invention is not limited to the method described in the European patent EP 04804828.4, which is only an embodiment. Any method enabling the perceptual interest data to be calculated (e.g. in the form of saliency maps) in an image is suitable. For example, the method described in the document by Itti et al entitled "*A model of saliency-based visual attention for rapid scene analysis*" and published in 1998 in IEEE trans. on PAMI can be used to analyse the image I in step 101.

Step 100 also comprises a cognitive analysis step 102 of the image I. A cognitive analysis of an image is an analysis that implicates reconstruction tools from cognitive models for example of representation of the memory and construction of direction. It involves a high level and overall knowledge of the information contained in the image, such as a set of pixels forming an object. This step 102 is capable of generating cognitive information.

FIG. 5 shows a particular embodiment of step 100 of the reframing method according to the invention, The analysis step 100 comprises the saliency analysis step 101 of the image I and the cognitive analysis step 102 of the image I.

According to this particular embodiment of the invention, the cognitive analysis step 102 of the image I comprises a text detection step 1020. For this purpose, the method described in the document by S. Ferreira, V. Garin and B. Gosselin entitled "A text detection technique applied in the framework of mobile camera-based application" and published in 2005 during the ICDAR workshop in Proc. of Camera-based Document Analysis and Recognition can be used. Any text zone detection method can be used. The invention is in no way limited by any one text detection method. Hence, the text zone detection can be carried out manually on a screen by an operator. More specifically this step is suitable for detecting the position and possibly the size of text zones in the image I.

It also comprises a faces detection step 1022. For this purpose, the method described in the document by P. Viola and M. Jones entitled "Rapid object detection using a boosted cascade of simple features" and published in 2001 during the conference Computer vision and pattern recognition can be used. Any face detection method can be used. The invention is in no way limited by any one face detection method. Hence, the face detection can be carried out manually on a screen by an operator. More specifically this step is suitable for detecting the position of faces in the image I. These faces may be detected in the form of bounding boxes.

According to a variant, the analysis step 100 comprises a detection step of balls in the image or again a detection step of individual persons or again a detection step of the field during a sports event. This object detection step can be carried out manually on screen by an operator. The method described in the document by S. Micilotta, E. Ong and R. Bowden entitled "Real-time upper body detection and 3D pose estimation in monoscopic images" and published in 2006 during the ECCV conference can equally be used to detect persons or silhouettes.

FIGS. 6, 7, 8, and 9 show a particular embodiment of step 110 of the reframing method according to the invention.

In reference to FIG. 6, at step 1100, a confidence parameter C is calculated from the saliency map generated at step 101. This confidence parameter C is representative of the confidence held in the quality of the reframing carried out using the first reframing method, i.e. dynamic without deformation. According to a parameter, the confidence parameter C is calculated as follows:

$$C = \frac{1}{\sqrt{1 + \text{nb\_faces}} \times \text{Coverage\_Conf} \times \text{Distance\_Conf} \times \text{Test\_Conf}}$$

where:
nb_faces is the number of faces detected in the image,
Coverage_conf is a value representative of the confidence held in the quality of the reframing carried out using the first reframing method and is calculated from the total saliency quantity in the image,
Distance_conf is a value representative of the confidence held in the quality of the reframing carried out using the first reframing method and is calculated from the distance between the pixels of the image for which the saliency is highest, and
Text_conf is a value representative of the confidence held in the quality of the reframing carried out using the first reframing method and is calculated from the width of the detected text zone.

The higher the number of faces detected, the less adapted is the first reframing method. The lower the average saliency Sr in the image or conversely the higher the average saliency is, the less adapted is the first reframing method.

Coverage_conf is for example defined as follows:

$Si\ Sr \leq 0.4, \text{alors Coverage\_Conf} = 2.5 \times Sr$ $Sinon\ 0.8 \leq Sr \leq 0.4, \text{alors Coverage\_Conf} = 2 \times (1 - 1.25 \times Sr)$ $Sinon\ 0.8 \leq Sr \leq 0.4, \text{alors Coverage\_Conf} = 0$ where Sr is the average of saliency values associated with the pixels of the image I to be reframed.

Naturally the thresholds defined above are provided as an example. They may be modified according to the visual attention model selected in step 101 to determine the saliency values. In fact, a visual attention model has its own representation of the saliency. Hence, depending on the model, a great number of salient elements ordered hierarchically may emerge or conversely only a few pixels may emerge, i.e. have a saliency value other than 0. It is a question of dynamics and of calibration.

Distance_conf is for example defined as follows:

$Si\ D(Mi) \leq WBB\ \text{Distance\_Conf} = 1$ $Sinon\ \text{Distance\_Conf} = \frac{1}{WBB - W} * D(Mi) - \frac{W}{WBB - W}$ Where D(Mi) is the distance between the two pixels of maximum saliency in the image.

Text_conf is for example defined as follows:

$Si\ \text{text width} \geq WBB\ \text{Text\_Conf} = 0.5$ $Sinon\ \text{Text\_Conf} = 1$ Where text width is the width of the text zone detected, this zone being of rectangular form.

At step 1102, the confidence parameter C is compared with a first predefined threshold value T1.

If C<T1 then the method continues to step 1106 if not the method continues to step 1104.

At step 1104, the first reframing method is selected. This method is able to define a reframing window F for which the format ratio is equal to $R_{target}$.

At step 1106, there is a check to see if a text zone was detected at step 1020.

An alternative reframing method to the first reframing method is sought.

If a text zone was detected then the method continues to step 1108 if not the method continues to step 1110 shown in FIG. 7.

At step 1108, the fourth reframing method is selected.

In reference to FIG. 7, at step 1110, there is a check to see if at least one face was detected in step 1022.

If a face was detected then the method continues to step 1112 if not the method continues to step 1134 shown in FIG. 8.

At step 1112, the number of faces detected is compared to a predefined threshold. Advantageously this threshold is equal to 2. If the number of faces detected is greater than or equal to 2 then the method continues to step 1114, if not it continues to step 1120.

At step 1114, the distance D(Vi) between the two faces furthest apart from one another in the image I is compared to the width WBB of the reframing window F. If D(Vi)>WBB then the method continues to step 116, if not it continues to step 118. More generally, if the reframing window F for which the format ratio is equal to the target format ratio is not able to contain the two faces furthest apart from one another then the method continues to step 1116, if not it continues to step 1118.

At step 1116, the second reframing method is selected.

At step 1118, the third reframing method is selected.

At step 1120, Sr' is calculated. Sr' is equal to the difference between Sr and the average of saliency values associated with the pixels of the face detected. At step 1122, Sr' is compared to the second and third threshold values T2 and T3 predefined such that T2<T3.

If T2≤Sr'≤T2, the method continues to step 1124 if not the method continues to step 1132.

At step 1124, Sp is calculated. Sp is a value representative of the saliency distribution in the image. More specifically, this value is representative of the saliency spread in the image. The higher the Sp value, the more the saliency in the image is spread. For this purpose, in reference to FIG. 8, the part of image I situated outside a box bounding the face predefined at step 1022 is divided into a plurality of columns C1, C2, C3, C4, C5 and C6. Each column is composed of several columns of pixels. The average saliency of each column, i.e. the average of saliency values associated with each pixel of the column in question, is calculated. Sp is the distance between the column for which the average saliency is highest and the face. This distance is for example calculated between the edges of the column and the centre of the bounding box.

At step 1126, Sp is compared to a fourth predefined threshold value T4.

If Sp>T4 then the method continues to step 1128 if not the method continues to step 1130.

At step 1128, the second reframing method is selected.
At step 1130, the third reframing method is selected.
At step 1132, the third reframing method is selected.

In reference to FIG. 9, during a step 1136, Sr calculated at step 1100, is compared to the second and third threshold values T2 and T3. According to a variant, these threshold values are different to those used at step 1122.

If T2≤Sr≤T3, the method continues to step 1138 if not the method continues to step 1144.

At step 1138, the distance D(Mi) between the two pixels of maximum saliency in the image is compared to the width WBB of the reframing window. If D(Mi)>WBB then the method continues to step 1140, if not it continues to step 1142. More generally, if the reframing window F for which the format ratio is equal to the target format ratio is not able to contain the two pixels of maximum saliency then the method continues to step 1140, if not it continues to step 1142.

At step 1140, the second reframing method is selected.
At step 1142, the third reframing method is selected.
At step 1144, the third reframing method is selected.

FIG. 10 diagrammatically illustrates a reframing device 2 according to the invention. Only the essential elements of the reframing device 2 are shown in FIG. 10. The reframing device 2 comprises, connected together by an address and data bus 24:
- a processing unit 21 such as a microprocessor (or CPU),
- a non-volatile memory of the ROM (Read Only Memory) type 22,
- a Random Access Memory (RAM) 23,
- an input and output interface 25, and
- possibly a man-machine interface 26.

It is noted that the word "register" used in the description of memories 22 and 23 designates in each of the memories mentioned, a memory zone of low capacity (some binary data) as well as a memory zone of large capacity (enabling a whole programme to be stored or all or part of the data representing an audio/video service received).

The non-volatile memory 22 contains algorithms implementing the steps 100, 110 and 120 of the reframing method according to the invention. When powered up, the processing unit 21 loads and runs the instructions of these algorithms. The random access memory 23 comprises notably operating programs of the processor unit 21 that are loaded at the powering up of the device, as well as the images to be processed i.e. to be reframed. The function of the input/output interface 25 is to receive the input signal (i.e. the image or images to be reframed) and emit the image or images reframed according to the steps 100 to 120 of the method of the invention. The man-machine interface 26 of the reframing device 2 enables the operator to interrupt the processing as soon as a reframing error that is not compatible with requirements occurs. This interface can also enable the operator to manually identify using this interface cognitive information such as text zones and faces. The reframed images are stored in the random access memory then possibly transferred to the read-only memory to be archived with a view to subsequent processing operations. The man-machine interface 26 possibly comprises a control panel, for example a keyboard and a display screen. According to variants, the reframing devices compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

Obviously, the invention is not limited to the embodiments mentioned above.

In particular, those skilled in the art may apply any variant to the stated embodiments and combine them to benefit from their various advantages. More specifically, saliency value determination methods other than those described could be used at step 101 of the method without calling into question the invention. Likewise, any face or text zone detection method can be used at step 102.

Finally, the predefined reframing methods can also vary, the only condition being their characteristic, namely a dynamic reframing method without deformation, a dynamic reframing method with deformation, a fixed reframing method without deformation and a zoom-out type reframing method.

Moreover, the invention described with a reframing window F for which the height is equal to H and for which the width WBB varies according to $R_{target}$ can be applied in the same way with a reframing window F for which the width is equal to W and for which the height HBB varies according to $R_{target}$.

In this latter case, the relationships described with WBB particularly at steps 1100, 1114 and 1138 are to be transposed to the variable HBB case. Likewise, the calculation of the saliency spread at step 1124 must be made by division of the part of the image I situated outside a box bounding the face predefined at step 1022 in a plurality of lines L1, L2, L3, L4, L5 and L6 as shown in FIG. 11.

What is claimed is:

1. A method for processing an image according to one reframing method to obtain a reframed image for which the format ratio is equal to a target format ratio, the method comprising the steps of:
   associating a saliency value with each pixel of said image;
   applying a face detection method and a text detection method of said image
   calculating a confidence parameter from said saliency values and from outputs of said face and text detection methods;
   comparing the confidence parameter to a first predetermined threshold value;
   selecting said reframing method in a set of at least two reframing methods according to the result of said comparison, and
   reframing said image using the selected reframing method;
   wherein, when said confidence parameter is less than said predefined threshold value, checking whether at least one zone of text is detected in said image and said reframing method is selected according the result of said checking;
   wherein, when no text zone is detected, the processing method comprises further checking whether at least one face is detected and said reframing method is selected according to the result of said further checking.

2. The method according to claim 1, wherein when said confidence parameter is greater than said first predefined threshold value, the reframing method selected is a method for dynamic reframing without deformation capable of delimiting a part of said image using a reframing window for which the format ratio is equal to the target format ratio.

3. The method according to claim 1, wherein when a text zone is detected, the selected reframing method is a fixed reframing method with deformation.

4. The method according to claim 1, wherein when at least two faces are detected and when said at least two faces are not capable of being comprised inside a reframing window of format ratio equal to the target format ratio then the reframing method selected is a dynamic reframing method with deformation, otherwise the reframing method selected is a fixed reframing method without deformation.

5. The method according to claim 1, wherein when a single face is detected, if the average saliency of said image from which is subtracted the average saliency of said single face is less than a second predefined threshold value or greater than a third predefined threshold value, said second and third threshold values being defined such that said third threshold value is greater than said second threshold value then the reframing method selected is a fixed reframing method without deformation, otherwise if the saliency in the image is spread then the reframing method selected is a dynamic reframing method with deformation, otherwise the reframing method selected is a fixed reframing method without deformation.

6. The method according to claim 1, wherein when no face is detected, if the average saliency of said image is less than a second predefined threshold value or greater than a third predefined threshold value, said second and third threshold values being defined such that said third threshold value is greater than said second threshold value then the reframing method selected is a fixed reframing method without deformation, otherwise if the two pixels of the image of maximum saliency value are not capable of being comprised in a reframing window of format ratio equal to the target format ratio then the reframing method selected is a dynamic reframing method with deformation, otherwise the reframing method selected is a fixed reframing method without deformation.

7. A device for reframing an image according to one reframing method to obtain a reframed image for which the format ratio is equal to a target format ratio, the device comprising an analysis module of said image configured to associate a saliency value with each pixel of said image and to apply a face detection method and a text detection method on said image;

a calculation module configured to calculate a confidence parameter from said saliency values and from outputs of said face and text detection methods;

a comparator configured to compare the confidence parameter to a first predefined threshold value, a selection module for selecting, for said image, said reframing method in a set of at least two reframing methods according to the result of the comparison carried out by the comparator; and a reframing module for reframing said image using the selected reframing method;

wherein when said confidence parameter is less than said predefined threshold value, said selection module checks whether at least one zone of text is detected in said image and selects said reframing method according to the result of said check; and wherein when no text zone is detected, said selection module further checks whether at least one face is detected and selects said reframing method according to the result of said further check.

\* \* \* \* \*